(12) United States Patent  (10) Patent No.: US 9,146,599 B2
Jenne et al.  (45) Date of Patent: Sep. 29, 2015

(54) DYNAMIC SYSTEM MANAGEMENT COMMUNICATION PATH SELECTION

(71) Applicant: Dell Products, LP, Round Rock, TX (US)

(72) Inventors: John E. Jenne, Austin, TX (US); Vijay Nijhawan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 306 days.

(21) Appl. No.: 13/898,170

(22) Filed: May 20, 2013

(65) Prior Publication Data

US 2014/0344595 A1 Nov. 20, 2014

(51) Int. Cl.
*G06F 1/32* (2006.01)

(52) U.S. Cl.
CPC .................. *G06F 1/32* (2013.01); *G06F 1/3206* (2013.01); *Y02B 60/1228* (2013.01)

(58) Field of Classification Search
CPC ....... G06F 1/32; G06F 1/3202; G06F 1/3206; Y02B 60/12; Y02B 60/1228
See application file for complete search history.

(56) References Cited

U.S. PATENT DOCUMENTS

| | | | |
|---|---|---|---|
| 2009/0190429 A1* | 7/2009 | Brittain et al. | 365/233.1 |
| 2010/0278195 A1* | 11/2010 | Wagh et al. | 370/476 |
| 2012/0017104 A1* | 1/2012 | Siba et al. | 713/323 |

* cited by examiner

*Primary Examiner* — Dennis M Butler
(74) *Attorney, Agent, or Firm* — Larson Newman, LLP

(57) ABSTRACT

An information handling system includes a processor, a controller hub, a shared higher bandwidth path coupling the processor to the controller hub, and an exclusive lower bandwidth path coupling the processor to the controller hub. The processor communicates system management information over the bandwidth path in response to a first set of criteria and communicates the information over the lower bandwidth path in response to the second set of criteria.

20 Claims, 6 Drawing Sheets

| SUBSYSTEM | SETTING | SYSTEM PROFILE | | | | | |
|---|---|---|---|---|---|---|---|
| | | PERFORMANCE | PERFORMANCE PER WATT (OS) | PERFORMANCE PER WATT (APC) | DENSE CONFIGURATION | CUSTOM |
| CPU | CPU POWER MGMT. | MAX. PERFORM. | OS DBPM | SYSTEM DBPM (APC) | SYSTEM DBPM (APC) | SYSTEM DBPM (APC) |
| | TURBO BOOST | ENABLED | ENABLED | ENABLED | DISABLED | ENABLED |
| | C1E | DISABLED | ENABLED | ENABLED | ENABLED | ENABLED |
| | C-STATES | DISABLED | ENABLED | ENABLED | ENABLED | ENABLED |
| | MONITOR/ MWAIT | ENABLED | ENABLED | ENABLED | ENABLED | ENABLED |
| | FREQUENCY | MAX. PERFORM. | MAX. PERFORM. | MAX. PERFORM. | D. CONFIG. OPTIMIZED | MAX. PERFORM. |
| | VOLTAGE | AUTO. | AUTO. | AUTO. | MAXIMUM | AUTO. |
| MEMORY | PATROL SCRUB | STANDARD | STANDARD | STANDARD | EXTENDED | STANDARD |
| | BIST DURATION | STANDARD | STANDARD | STANDARD | EXTENDED | STANDARD |
| | REFRESH RATE | 1X | 1X | 1X | 2X | 1X |
| SYS. MGMT. COMMUN. | ECI COMMUN. | HARDWARE ECI | DYNAMIC ECI | DYNAMIC ECI | ECI OVER CTHI | DYNAMIC ECI |
| THERMAL | THERMAL ALGORITHM | MAX. PERFORM. | MINIMUM POWER | MINIMUM POWER | DENSE CONFIG. | MAX. PERFORM. |

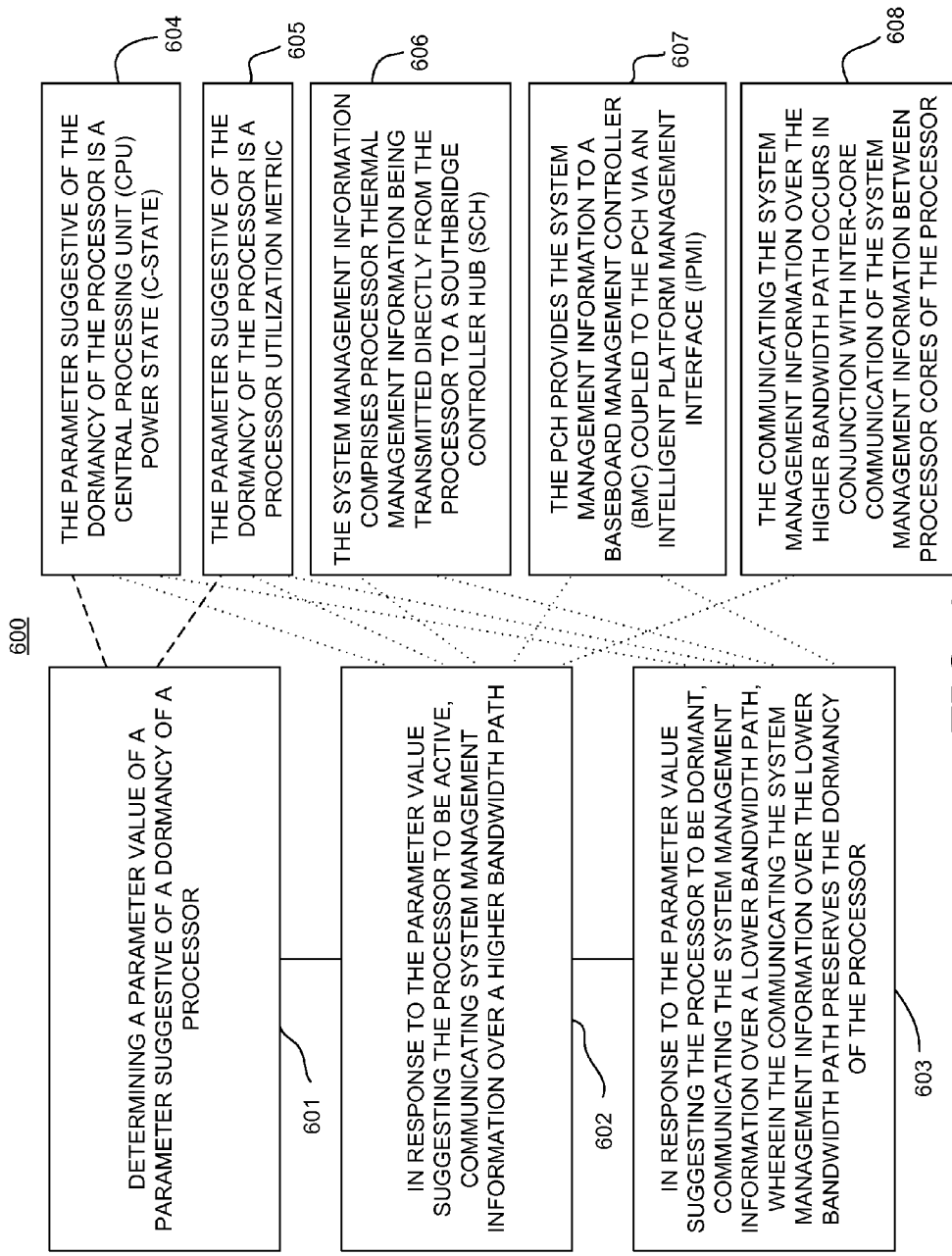

DYNAMIC SYSTEM MANAGEMENT COMMUNICATION PATH SELECTION

FIELD OF THE DISCLOSURE

This disclosure generally relates to information handling systems, and more particularly relates to communication of systems management information.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Energy efficiency and responsiveness to environmental conditions are factors in modern computing platforms. However, approaches to furthering such factors may not work harmoniously together under all conditions. Efforts to communicate system management information, which may be used, for example, to enhance responsiveness to environmental conditions, may impair, or be impaired by, techniques for increasing energy efficiency.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 3 is a table 300 illustrating a plurality of system profiles to govern system operation and communication of system management information in accordance with at least one embodiment;

FIG. 6 is a block diagram illustrating a method in accordance with at least one embodiment.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
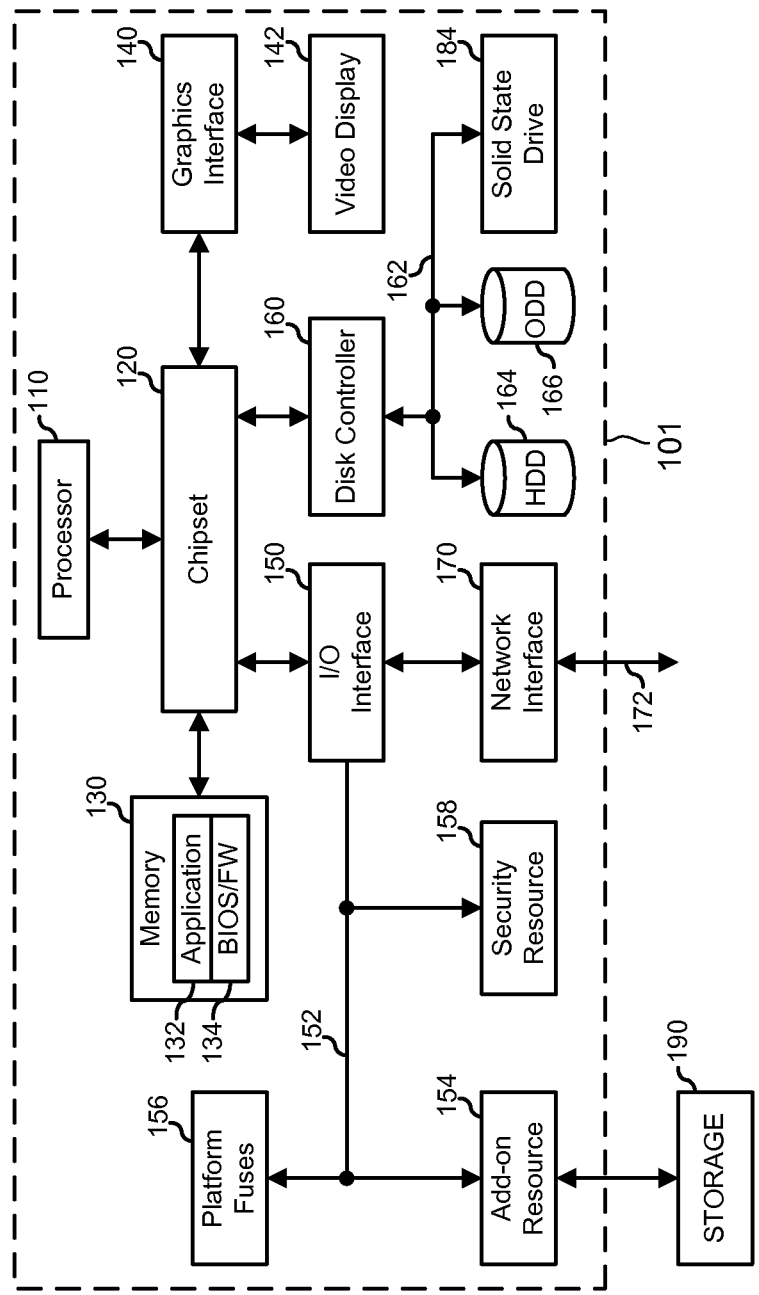
FIG. 1 is a block diagram illustrating an information handling system 100 in accordance with at least one embodiment of the disclosure.

FIG. 1 shows an information handling system 100 that includes a processor 110, a chipset 120, a memory 130, a graphics interface 140, an input/output (IO) interface 150, a disk controller 160, a network interface 170, and a disk emulator 180. In a particular embodiment, information handling system 100 is used to carry out one or more of the methods described herein. In another embodiment, one or more of the systems described herein are implemented in the form of information handling system 100. In one form, the information handling system 100 can be a computer system such as a server. As shown in FIG. 1, the information handling system 100 can include a first physical processor 110 and can further include additional physical processors. The first physical processor 110 can be coupled to a chipset 120 via a first host bus. Further, the additional physical processors can be coupled to the chipset 120 via one or more additional host buses. The chipset 120 can support multiple processors and can allow for simultaneous processing of multiple processors and support the exchange of information within information handling system 100 during multiple processing operations.

Chipset 120 is connected to and supports processor 110, allowing the processor to execute machine-executable code. In a particular embodiment, information handling system 100 includes one or more additional processors, and chipset 120 supports the multiple processors, allowing for simultaneous processing by each of the processors and permitting the exchange of information among the processors and the other elements of the information handling system. Chipset 120 can be connected to processor 110 via a unique channel, or via a bus that shares information among the processor, the chipset, and other elements of information handling system 100.

According to one aspect, the chipset 120 can be referred to as a memory hub or a memory controller. For example, the chipset 120 can include an Accelerated Hub Architecture (AHA) that uses a dedicated bus to transfer data between first physical processor 110 and an additional physical processor. For example, the chipset 120, including an AHA enabled-chipset, can include a memory controller hub and an input/output (IO) controller hub. As a memory controller hub, the chipset 120 can function to provide access to the first physical processor 110 using the first host bus and an additional physical processor using an additional host bus. The chipset 120 can also provide a memory interface for accessing memory 130 using a memory bus. In a particular embodiment, the first host bus, the additional host bus, and the memory bus may be individual buses or part of the same bus. The chipset 120 can also provide bus control and can handle transfers between the first host bus, the additional host bus, and the memory bus.

According to another aspect, the chipset 120 can be generally considered an application specific chipset that provides connectivity to various buses, and integrates other system functions. For example, the chipset 120 can be provided using an Intel® Hub Architecture (IHA) chipset that can also include two parts, a Graphics and AGP Memory Controller Hub (GMCH), where AGP stands for Accelerated Graphics Port, and an IO Controller Hub (ICH). For example, an Intel 820E, an 815E chipset, or any combination thereof, available from the Intel Corporation of Santa Clara, Calif., can provide at least a portion of the chipset 120. The chipset 120 can also be packaged as an application specific integrated circuit (ASIC).

Memory 130 is connected to chipset 120. Memory 130 and chipset 120 can be connected via a unique channel, or via a bus that shares information among the chipset, the memory, and other elements of information handling system 100. In another embodiment (not illustrated), processor 110 is connected to memory 130 via a unique channel. In another embodiment (not illustrated), information handling system 100 includes separate memory dedicated to each of the one or more additional processors. A non-limiting example of memory 130 includes static random access memory (SRAM), dynamic random access memory (DRAM), non-volatile random access memory (NVRAM), read only memory (ROM), flash memory, another type of memory, or any combination thereof.

Graphics interface 140 is connected to chipset 120. Graphics interface 140 and chipset 120 can be connected via a unique channel, or via a bus that shares information among the chipset, the graphics interface, and other elements of information handling system 100. Graphics interface 140 is connected to a video display 142. Other graphics interfaces (not illustrated) can also be used in addition to graphics interface 140 as needed or desired. Video display 142 includes one or more types of video displays, such as a flat panel display, another type of display device, or any combination thereof.

The information handling system 100 can also include a video graphics interface 140 that can be coupled to the chipset 120 using a video host bus. In one form, the video graphics interface 140 can be an Accelerated Graphics Port (AGP) interface to display content within a video display unit 142. Other graphics interfaces may also be used. The video graphics interface 140 can provide a video display output to the video display unit 142. The video display unit 142 can include one or more types of video displays such as a flat panel display (FPD) or other type of display device.

IO interface 150 is connected to chipset 120. IO interface 150 and chipset 120 can be connected via a unique channel, or via a bus that shares information among the chipset, the IO interface, and other elements of information handling system 100. Other IO interfaces (not illustrated) can also be used in addition to IO interface 150 as needed or desired. IO interface 150 is connected via an IO interface 152 to one or more add-on resources 154. Add-on resource 154 is connected to a storage system 190, and can also include another data storage system, a graphics interface, a network interface card (NIC), a sound/video processing card, another suitable add-on resource or any combination thereof. IO interface 150 is also connected via IO interface 152 to one or more platform fuses 156 and to a security resource 158. Platform fuses 156 function to set or modify the functionality of information handling system 100 in hardware. Security resource 158 provides a secure cryptographic functionality and includes secure storage of cryptographic keys. A non-limiting example of security resource 158 includes a Unified Security Hub (USH), a Trusted Platform Module (TPM), a General Purpose Encryption (GPE) engine, another security resource, or a combination thereof.

The information handling system 100 can also include an IO interface 150 that can be connected via an IO bus to the chipset 120. The IO interface 150 can be connected to an IO bus 152, which may be connected to at least one IO device. The IO bus 152 can include industry standard buses or proprietary buses and respective interfaces or controllers. For example, the IO bus 152 can also include a Peripheral Component Interconnect (PCI) bus or a high speed PCI-Express bus. In one embodiment, a PCI bus can be operated at approximately 66 MHz and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the IO bus 152 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 120 can be a chipset employing a Northbridge/Southbridge chipset configuration (not illustrated). For example, a Northbridge portion of the chipset 120 can communicate with the first physical processor 110 and can control interaction with the memory 130, the IO interface 150 that can be operable as a PCI bus, and activities for the video graphics interface 140. The Northbridge portion can also communicate with the first physical processor 110 using first host bus and with any additional physical processor using an additional host bus. The chipset 120 can also include a Southbridge portion (not illustrated) of the chipset 120 and can handle IO functions of the chipset 120. The Southbridge portion can manage the basic forms of IO such as Universal Serial Bus (USB), serial IO, audio outputs, Integrated Drive Electronics (IDE), and ISA IO for the information handling system 100.

Disk controller 160 is connected to chipset 120. Disk controller 160 and chipset 120 can be connected via a unique channel, or via a bus that shares information among the chipset, the disk controller, and other elements of information handling system 100. Other disk controllers (not illustrated) can also be used in addition to disk controller 160 as needed or desired. Disk controller 160 includes a disk interface 162.

Disk controller 160 is connected to one or more disk drives via disk interface 162. Such disk drives include a hard disk drive (HDD) 164, and an optical disk drive (ODD) 166, and can include one or more disk drive as needed or desired. ODD 166 can include a Read/Write Compact Disk (RW-CD), a Read/Write Digital Video Disk (RW-DVD), a Read/Write mini Digital Video Disk (RW mini-DVD, another type of optical disk drive, or any combination thereof. Additionally, disk controller 160 is connected to disk emulator 180. Disk emulator 180 permits a solid-state drive 184 to be coupled to information handling system 100 via an external interface 182. External interface 182 can include industry standard busses such as USB or IEEE 1394 (Firewire) or proprietary busses, or any combination thereof. Alternatively, solid-state drive 184 can be disposed within information handling system 100.

Network interface device 170 is connected to IO interface 150. Network interface 170 and IO interface 150 can be coupled via a unique channel, or via a bus that shares information among the IO interface, the network interface, and other elements of information handling system 100. Other network interfaces (not illustrated) can also be used in addition to network interface 170 as needed or desired. Network interface 170 can be a network interface card (NIC) disposed within information handling system 100, on a main circuit board such as a baseboard, a motherboard, or any combination thereof, integrated onto another component such as chipset 120, in another suitable location, or any combination thereof. Network interface 170 includes a network channel 172 that provide interfaces between information handling system 100 and other devices (not illustrated) that are external to information handling system 100. Network interface 170 can also include additional network channels (not illustrated).

Information handling system 100 includes one or more application programs 132, and Basic Input/Output System and Firmware (BIOS/FW) code 134. BIOS/FW code 134 functions to initialize information handling system 100 on power up, to launch an operating system, and to manage input and output interactions between the operating system and the other elements of information handling system 100. In a particular embodiment, application programs 132 and BIOS/FW code 134 reside in memory 130, and include machine-executable code that is executed by processor 110 to perform various functions of information handling system 100. In another embodiment (not illustrated), application programs and BIOS/FW code reside in another storage medium of information handling system 100. For example, application programs and BIOS/FW code can reside in HDD 164, in a ROM (not illustrated) associated with information handling system 100, in an option-ROM (not illustrated) associated with various devices of information handling system 100, in storage system 190, in a storage system (not illustrated) associated with network channel 172, in another storage medium of information handling system 100, or a combination thereof. Application programs 132 and BIOS/FW code 134 can each be implemented as single programs, or as separate programs carrying out the various features as described herein.

Some elements of information handling system 100 may be disposed as a common platform 101. Some elements of information handling system 100 may be disposed outside of common platform 101. Common platform 101 may be configured as a unitized assembly, for example, within a common enclosure, or may be configured in a modular form.

Figure 2:
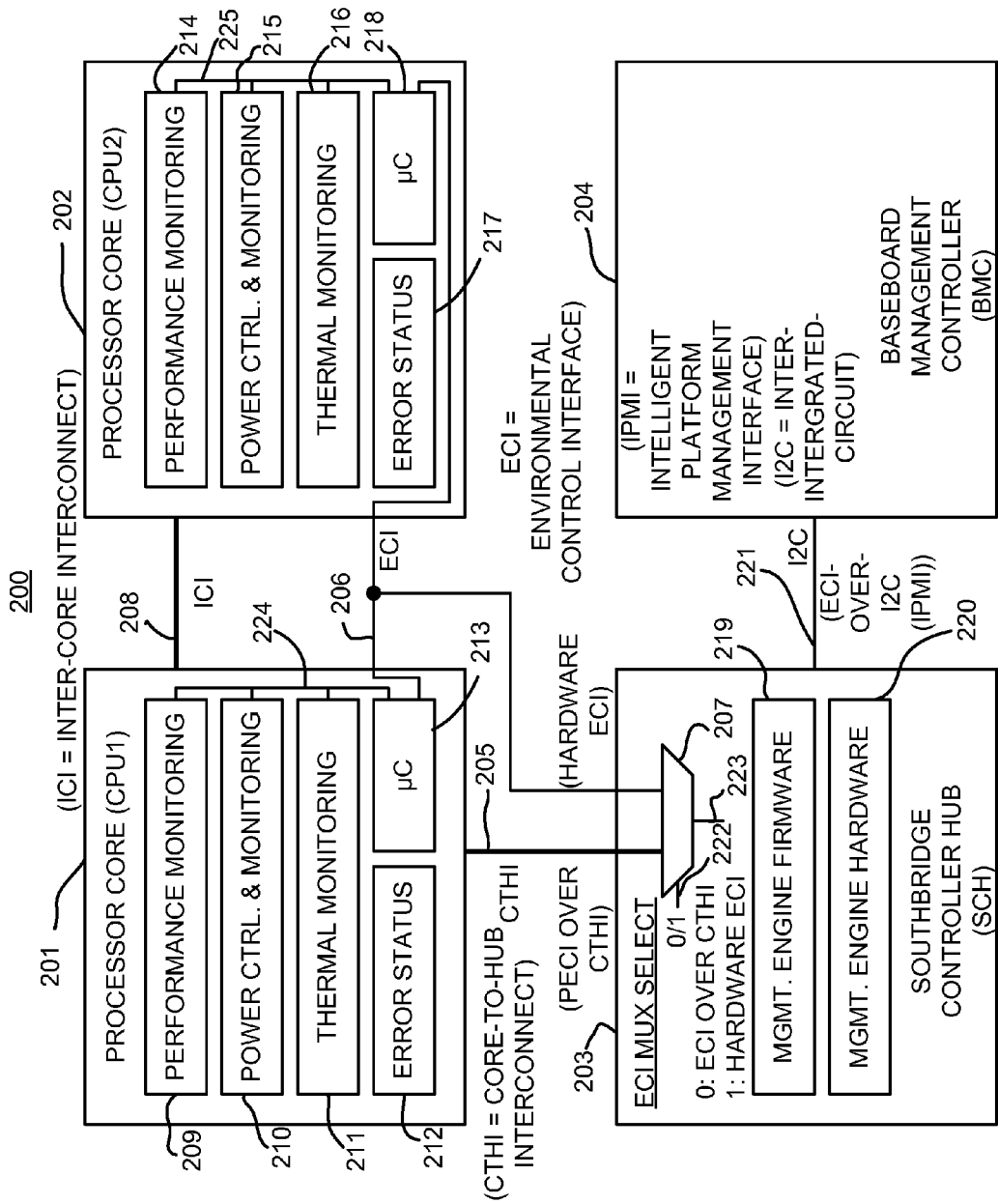
FIG. 2 is a block diagram illustrating an information handling system 200 comprising processor core 201, processor core 202, southbridge controller hub 203, and baseboard management controller 204 in accordance with at least one embodiment.

FIG. 2 is a block diagram illustrating an information handling system 200 comprising processor core 201, processor core 202, southbridge controller hub 203, and baseboard management controller 204 in accordance with at least one embodiment. Processor core 201, denoted as CPU1, comprises performance monitoring module 209, a power control and monitoring module 210, thermal monitoring module 211, error status module 212, and microcontroller 213. Microcontroller 213 is connected to performance monitoring module 209, to power control and monitoring module 210, and to thermal monitoring module 211. Processor core 202, denoted as CPU2, comprises performance monitoring module 214, a power control and monitoring module 215, thermal monitoring module 216, error status module 217, and microcontroller 218. Microcontroller 218 is connected to performance monitoring module 214, to power control and monitoring module 215, and to thermal monitoring module 216. Processor core 201 is connected to processor core 202 via an inter-core interconnect (ICI) 208, for example, a quick path interconnect (QPI) or, as another example, a HyperTransport (HT) interconnect, which is of relatively high bandwidth. Processor core 201 is connected to processor core 202 via an environmental control interface (ECI) 206 (i.e., hardware ECI), for example, a platform environmental control interface (PECI), which is of relatively low bandwidth, but which is exclusively devoted to communication of system management information, so its latency is relatively low and it is relatively immune to contention for available bandwidth among different types of information (e.g., system management information and non-system management information). As an example, microcontroller 213 of processor core 201 is connected to microcontroller 218 of processor core 202 via ECI 206.

Southbridge controller hub 203 may, for example, provide southbridge functionality and may, as an example, be a platform controller hub (PCH) or, as another example, a fusion controller hub (FCH). Southbridge controller hub (SCH) 203 is connected to processor core 201 via a core-to-hub interconnect (CTHI) 205, for example, a direct media interface (DMI) or, as another example, a unified media interface (UMI), which is of relatively high bandwidth and is configured for general communication (e.g., including non-system management information) between SCH 203 and processor core 201. ECI 206 is also connected to SCH 203. SCH 203 comprises management engine hardware 220 and management engine firmware 219. Management engine firmware 219 comprises non-volatile storage of instruction code to instruct management engine hardware 220 to perform system management. SCH 203 is connected to baseboard management controller (BMC) 204 via intelligent platform management interface (IPMI) 221, which may be implemented, for example as an inter-integrated circuit (I2C) interconnect. IPMI 221 is of relatively low bandwidth, is of relatively low latency, and is relatively immune to contention for available bandwidth among different types of information, as BMC 204 is devoted to system management, so it need not communicate non-system management information that could require more bandwidth).

Processor core 201 may provide system management information (e.g., ECI information) over ECI 206 or over core-to-hub interconnect 205. SCH 203 may be configured to receive system management information over ECI 206 or over core-to-hub interconnect 205. For example, SCH 203 may be configured to provide multiplexer 207, implemented in logic circuitry or in management engine hardware 220 executing management engine firmware 219, to select between reception of system management information via ECI 206 and via core-to-hub interconnect 205. For example, a value or signal representing a binary value (e.g., zero) may be applied to selection input 222 of multiplexer 207 to select ECI over core-to-hub interconnect, and a value or signal representing a binary value (e.g., one) may be applied to selection input 222 to select hardware ECI. Multiplexer 207 provides system management information from the selected input at output 223. The value or signal at selection input 222 may be switched rapidly, in concert with the transmission of system management information by processor core 201 to provide nearly simultaneous communication of system management information via both ECI 206 and core-to-hub interconnect 205. In accordance with at least one embodiment, multiplexer 207 may be implemented in hardware, as a semiconductor logic device. In accordance with at least one embodiment, multiplexer 207 may be implemented using instruction code executed by a processor (i.e., in software), wherein the instruction code routes system management information via ECI 206 Alternatively, multiplexer 207 may be omitted, and SCH 203 may receive system information over both ECI 206 and core-to-hub interconnect 205, either simultaneously or at different times.

Communicating system management information over a shared, higher-bandwidth path (e.g., ECI over core-to-hub interconnect) can provide advantages in power monitoring, power limiting, and thermal monitoring response times. However, constant polling on the core-to-hub interconnect may unfavorably impact the central processing unit (CPU) socket's C-state residency (where a C-state is a CPU power state of an advanced configuration and power interface (ACPI)), which may prevent a processor from achieving a dormancy state desired for energy efficiency. ECI over core-to-hub interconnect may also generate ECI over inter-core interconnect traffic (e.g., between processor cores), so in addition to package level C-state residency impact, ECI over core-to-hub interconnect may unfavorably impact core-to-hub interconnect and inter-core interconnect link level power management and increase IDLE power consumption. The additional core-to-hub interconnect traffic due to ECI accesses may also unfavorably impact the performance of other traffic on the core-to-hub interconnect channel such as the peripheral component interconnect express (PCIe), serial attached small computer system interface/serial advanced technology attachment (SAS/SATA), universal serial bus (USB), and Ethernet traffic by using some of the bandwidth of the core-to-hub interconnect channel that would otherwise be available for communicating the other traffic in a more timely manner. While ECI response times may be improved by communication via the higher bandwidth core-to-hub interconnect channel, the potential CPU IDLE power savings and the low latency performance of other information communicated over the core-to-hub interconnect channel could be unfavorably impacted.

Communicating system management information over an exclusive, lower bandwidth path (e.g., hardware ECI) can avoid delays of the communication of the system management information as a function of amounts of other information being communicated over a shared, higher bandwidth path (e.g., ECI over core-to-hub interconnect) and can allow communication of the system management information to proceed without disturbing a dormancy state of a processor and without reducing bandwidth available for communication of other information via a shared, higher bandwidth path. However, the lower bandwidth of the exclusive, lower bandwidth path limits the amount of system management information that may be communicated over a unit of time. Thus, for example, responsiveness of the information handling system to environmental conditions may be limited.

Accordingly, a selectable, dynamic system and method for communication of system management information is provided. When, for example, a dormancy state of a processor is to be maintained, system management information may be communicated over an exclusive, lower bandwidth path (e.g., hardware ECI) to avoid, for example, waking up the processor from a sleep state. When the processor is not in a dormancy state, but is in an active state, if the volume of other information being communicated over the shared, higher bandwidth path is small enough to afford available bandwidth for communication of system management information over the shared, higher bandwidth path, system management information may be communicated over the shared, higher bandwidth path to utilize at least a portion of the higher bandwidth of the shared, higher bandwidth path to allow communication of more system management information per unit time than may be possible via the exclusive, lower bandwidth path. If the volume of other information being communicated over the shared, higher bandwidth path does not afford sufficient available bandwidth for communication of the full amount of system management information over the shared, higher bandwidth path, a portion of the system management information may be communicated over the exclusive, lower bandwidth path, and the remainder of the system management information may be communicated over the shared, higher bandwidth path. Decisions as to whether to communicate the system management information via the shared, higher bandwidth path or via the exclusive, lower bandwidth path (or via both) may be made in accordance with a selection of a system profile that defines a setting for making such decisions, and such a setting may statically or dynamically determine the path or paths to be used. Thus, a set of criteria for determining that system management information is to be communicated via the shared, higher bandwidth path may comprise a selection of a system profile that specifies such communication of the system management information or may comprise system conditions (e.g., processor power-saving activity-enablement state, processor utilization, power consumption, environmental conditions, processor thermal condition, interface bandwidth utilization, etc.) that may weigh in the determination.

FIG. 3 is a table 300 illustrating a plurality of system profiles to govern system operation and communication of system management information in accordance with at least one embodiment. Table 300 includes columns for types of subsystems, settings, and system profiles. Several system profile columns are shown, each one showing values of the settings for a different system profile. For example, system profiles shown include a performance system profile, a performance per watt (based on operating system (OS) control) system profile, a performance per watt (based on active power controller (APC) control) system profile, a dense configuration system profile, and a custom system profile. For the central processing unit (CPU) subsystem, rows are shown for a CPU power management setting, for a turbo boost setting, for a C1E processor state setting, for a C-states processor state setting, and for MONITOR/MWAIT setting. For the memory subsystem, rows are shown for a frequency setting, for a voltage setting, for a patrol scrub setting, for a built-in self test (BIST) duration setting, and for a refresh rate setting. For the system management communication subsystem, a row is shown for ECI communication. For the thermal management subsystem, a row is shown for a thermal management algorithm.

For the performance system profile, the CPU power management setting is set to maximum performance, the turbo boost setting is enabled, the C1E processor state setting is disabled, the C-states processor setting is disabled, the MONITOR/MWAIT setting is enabled, the frequency setting is set to maximum performance, the voltage setting is set to automatic, the patrol scrub setting is set to standard, the BIST duration setting is set to standard, the refresh rate is set to one time (1×), the ECI communication setting is set to hardware ECI, and the thermal algorithm setting is set to maximum performance. For the performance per watt (based on OS control) system profile, the CPU power management setting is set to OS demand-based power management (DBPM), the turbo boost setting is enabled, the C1E processor state setting is enabled, the C-states processor setting is enabled, the MONITOR/MWAIT setting is enabled, the frequency setting is set to maximum performance, the voltage setting is set to automatic, the patrol scrub setting is set to standard, the BIST duration setting is set to standard, the refresh rate is set to one time (1×), the ECI communication setting is set to dynamic ECI, and the thermal algorithm setting is set to minimum power. For the performance per watt (based on APC control) system profile, the CPU power management setting is set to system DBPM (based on APC control), the turbo boost setting is enabled, the C1E processor state setting is enabled, the C-states processor setting is enabled, the MONITOR/MWAIT setting is enabled, the frequency setting is set to maximum performance, the voltage setting is set to automatic, the patrol scrub setting is set to standard, the BIST duration setting is set to standard, the refresh rate is set to one time (1×), the ECI communication setting is set to dynamic ECI, and the thermal algorithm setting is set to minimum power. For the dense configuration system profile, the CPU power management setting is set to system DBPM (based on APC control), the turbo boost setting is disabled, the C1E processor state setting is enabled, the C-states processor setting is enabled, the MONITOR/MWAIT setting is enabled, the frequency setting is set to dense configuration optimized, the voltage setting is set to maximum, the patrol scrub setting is set to extended, the BIST duration setting is set to extended, the refresh rate is set to two times (2×), the ECI communication setting is set to ECI over core-to-hub interconnect, and the thermal algorithm setting is set to dense configuration. For the custom system profile, the CPU power management setting is set to system DBPM (based on APC control), the turbo boost setting is enabled, the C1E processor state setting is enabled, the C-states processor setting is enabled, the MONITOR/MWAIT setting is enabled, the frequency setting is set to maximum performance, the voltage setting is set to automatic, the patrol scrub setting is set to standard, the BIST duration setting is set to standard, the refresh rate is set to one time (1×), the ECI communication setting is set to dynamic ECI, and the thermal algorithm setting is set to maximum performance. Other permutations and variations of values are possible. By selecting a system profile, the values associated with that system profile, including the ECI communication setting value of that system profile are selected to be applied to operation of the information handling system. Thus, any one of several ECI communication setting values, for example, hardware ECI, ECI over core-to-hub interconnect, dynamic ECI, nearly simultaneous combined hardware ECI and ECI over core-to-hub interconnect, and simultaneous hardware ECI and ECI over core-to-hub interconnect may be selected.

Figure 4:
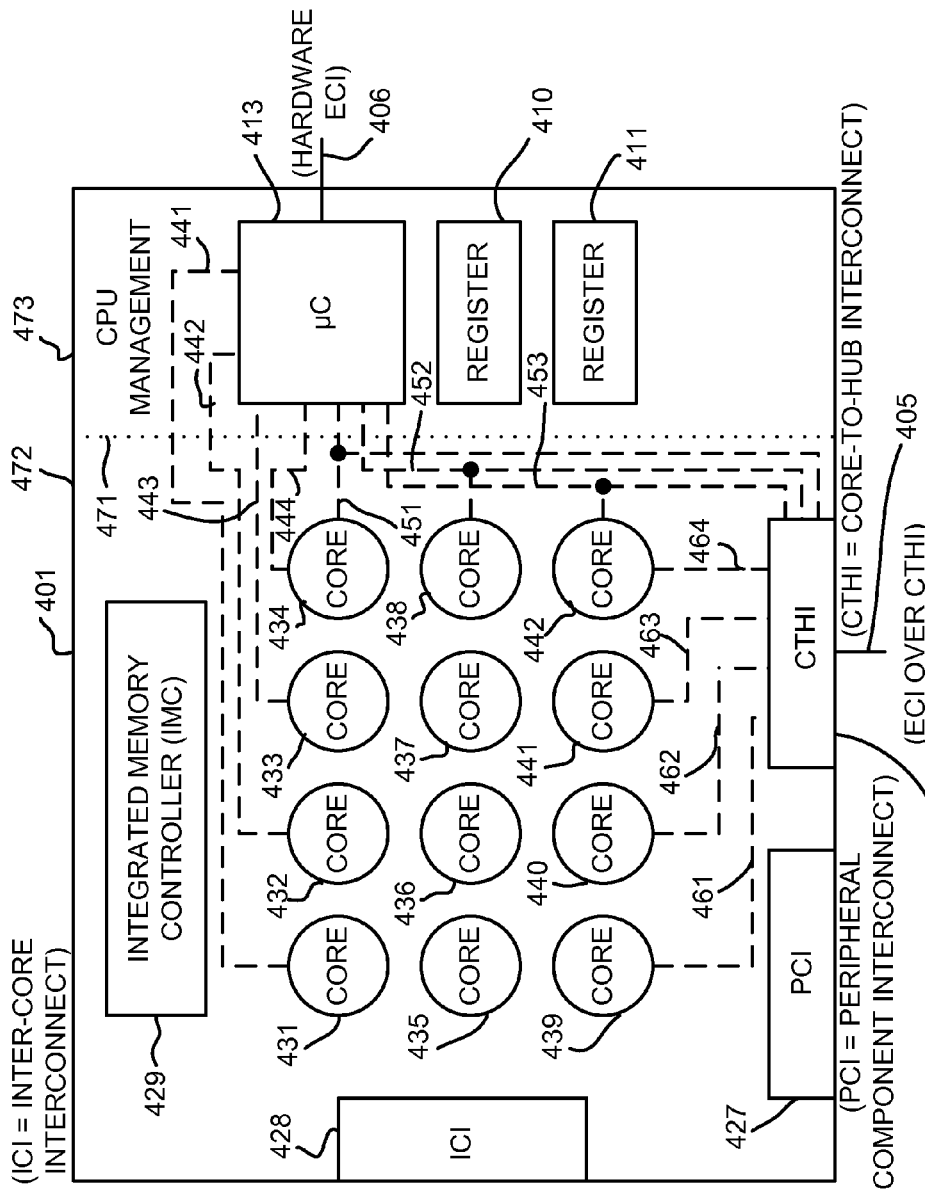
FIG. 4 is a block diagram of a processor with which at least one embodiment may be practiced.

FIG. 4 is a block diagram of a processor 401 with which at least one embodiment may be practiced. Processor 401 comprises processor section 472 and CPU management section 473, as denoted by line 471. Processor section 472 comprises processor cores 431-442, integrated memory controller (IMC) 429, core-to-hub interconnect (CTHI) module 426, peripheral component interconnect (PCI) module 427, inter-core interconnect (ICI) module 428. CTHI module 426 is connected to core-to-hub interconnect 405. CPU management section 473 comprises microcontroller 413 and a plurality of registers shown as comprising register 410 and register 411. Microcontroller 413 is connected to hardware ECI 406.

Microcontroller 413 is connected to processor cores 431-442 by a plurality of connections, such as connections 441-444 and 451-453. CTHI module 426 is connected to processor cores by a plurality of connections, such as connections 451-453 and 461-464. Thus, microcontroller 413 and CTHI module 426 can communicate system management information with processor cores 431-442 and can communicate system management information via hardware ECI 406 and core-to-hub interconnect 405, respectively.

Figure 5:
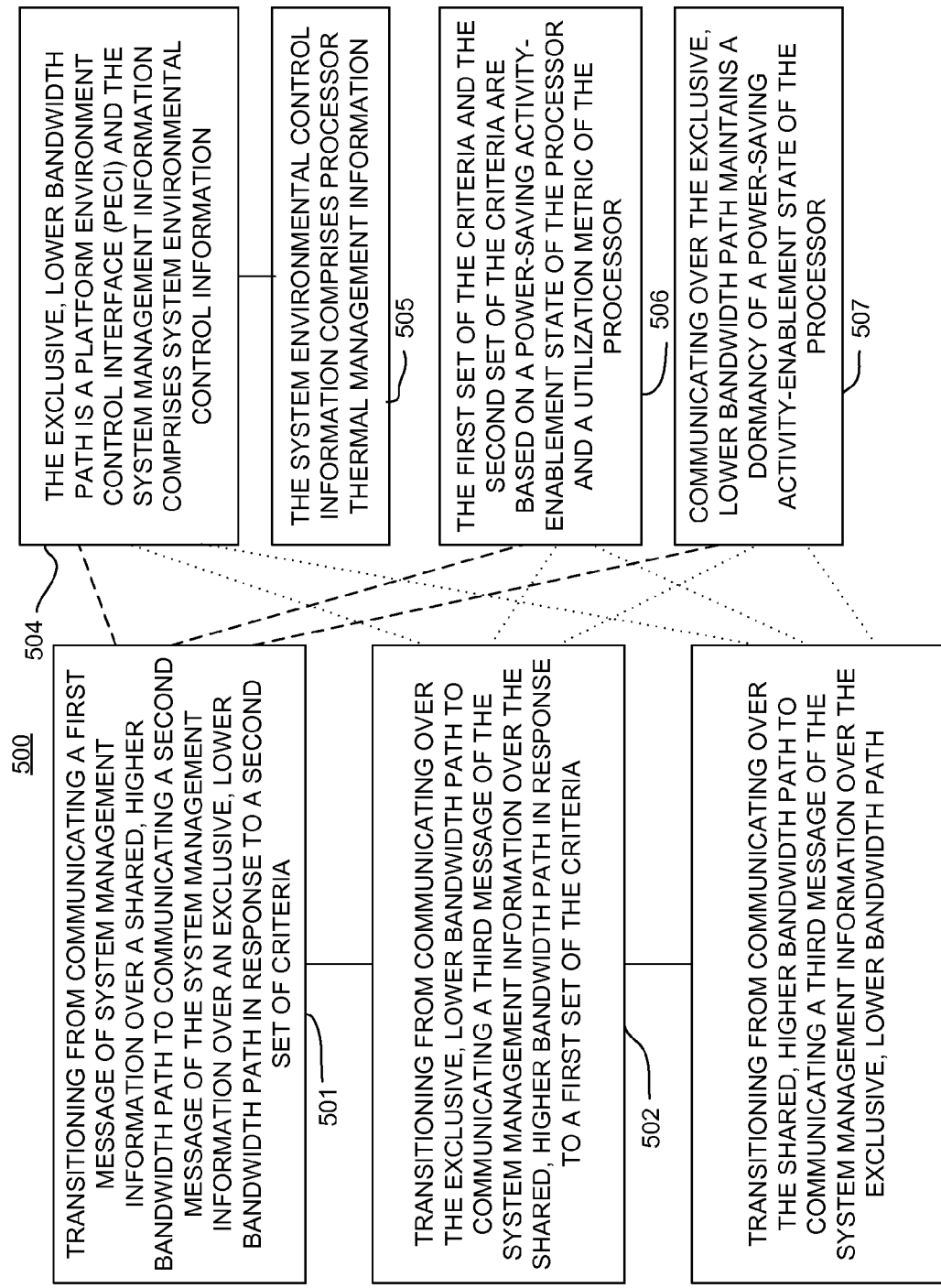
FIG. 5 is a flow diagram illustrating a method in accordance with at least one embodiment.

FIG. 5 is a flow diagram illustrating a method 500 in accordance with at least one embodiment. Method 500 begins in block 501, where transitioning from communicating a first message of system management information over a shared, higher bandwidth path to communicating a second message of the system management information over an exclusive, lower bandwidth path in response to a second set of criteria occurs. From block 501, method 500 continues to block 502. In block 502, transitioning from communicating over the exclusive, lower bandwidth path to communicating a third message of the system management information over the shared, higher bandwidth path in response to a first set of the criteria occurs. From block 502, method 500 continues to block 503. In block 503, transitioning from communicating over the shared, higher bandwidth path to communicating a third message of the system management information over the exclusive, lower bandwidth path occurs. As shown by blocks 504-507 and their connections with blocks 501-503, embodiments of method 500 may include zero or more attributes of blocks 504-507. In block 504, the exclusive, lower bandwidth path is an environment control interface (ECI) and the system management information comprises system environmental control information. In block 505, the system environmental control information comprises processor thermal management information. In block 506, the first set of the criteria and the second set of the criteria are based on a power-saving activity-enablement state of the processor and a utilization metric of the processor. In block 507, communicating over the exclusive, lower bandwidth path maintains a dormancy of a power-saving activity-enablement state of the processor.

FIG. 6 is a block diagram illustrating a method 600 in accordance with at least one embodiment. Method 600 begins in block 601, where determining a parameter value of a parameter suggestive of a dormancy of a processor occurs. From block 601, method 600 continues to block 602. In block 602, in response to the parameter value suggesting the processor to be active, communicating system management information over a higher bandwidth path occurs. From block 602, method 600 continues to block 603. In block 603, in response to the parameter value suggesting the processor to be dormant, communicating the system management information over a lower bandwidth path occurs, wherein the communicating the system management information over the lower bandwidth path preserves the dormancy of the processor. As shown by blocks 604-608 and their connections with blocks 601-603, embodiments of method 600 may include zero or more attributes of blocks 604-608. In block 604, the parameter suggestive of the dormancy of the processor is a central processing unit (CPU) power state (C-state). In block 605, the parameter suggestive of the dormancy of the processor is a processor utilization metric. In block 606, the system management information comprises processor thermal management information being transmitted directly from the processor to a southbridge controller hub (SCH). In block 607, the SCH provides the system management information to a baseboard management controller (BMC) coupled to the SCH via an intelligent platform management interface (IPMI). In block 608, the communicating the system management information over the higher bandwidth path occurs in conjunction with inter-core communication of the system management information between processor cores of the processor.

In accordance with at least one embodiment, to offset the potential IDLE power and low latency impact of ECI over core-to-hub interconnect, platform level control of communication of system management information is provided to statically or dynamically switch between ECI over core-to-hub interconnect and hardware ECI. When maximum performance is desired, a basis input-output system (BIOS) or integrated Dell remote access controller (iDRAC) setup option selection may be received so that all ECI communications are performed over the ECI hardware interface. For a performance per watt focus, a selection of a dynamic mode may be received, where the platform dynamically switches between ECI over core-to-hub interconnect and hardware ECI. When a fast and efficient power limiting solution is desired, a setup option selection may be received for communicating system management information specifically via ECI over core-to-hub interconnect.

Selections of system profiles may be received for configuring multiple BIOS and iDRAC settings for performance, performance per watt, or enhanced reliability, availability, and serviceability (RAS). Such system profiles may include a setup option for ECI communication. Static selection for ECI over core-to-hub interconnect or hardware ECI may be desirable for some workloads. Dynamic ECI may provide optimized selection between ECI over core-to-hub interconnect and hardware ECI. Dynamic ECI may be implemented in BIOS as part of an active power controller (APC), such as Dell Active Power Controller (DAPC).

If CPU utilizations are low (i.e. <20%), then the CPU socket may spend considerable time in a deeper C-state or core-to-hub interconnect and inter-core interconnect may be in a lower power state. During light workloads, DAPC may switch ECI communication to hardware ECI to remove the ECI impact on C-state residency or link level power management. For heavier workloads, DAPC may switch ECI communications back to ECI over core-to-hub interconnect. DAPC may use host embedded controller interface (HECI) communication with a management engine to switch the ECI communication between hardware ECI and ECI over core-to-hub interconnect.

A controller for switching between ECI over core-to-hub interconnect and hardware ECI may collaborate with a module executing platform power limiting algorithms (e.g., a node manager) such that power limit policies desiring fast response times (e.g., power supply unit (PSU) output or blade allocation power capping) may trigger ECI over core-to-hub interconnect for fast response times. Thresholds or throttling statistics for these fast response policies may trigger use of the hardware ECI communication path. A controller for determining use of ECI over core-to-hub interconnect or hardware ECI for communication of system management information may execute an algorithm for dynamically determining in-band or out-of-band CPU management. Such a controller may be implemented using existing hardware by implementing such an algorithm in software to be executed by the hardware so as to transform the existing hardware into a machine for providing new and useful control of communication of system management information. Embodiments may be applied to a system providing paths for in-band or out-of band systems management so as to control selection among such paths. In-band communication may include communication of system management information along a path also used for communication of other information, such as information (e.g., application instructions, application data, etc.) being processed by a processor, and out-of-band communication may include communication of system management information, which may be information about the processing of other information being processed by a processor (e.g., information to report conditions of the processor or to control parameters of the processor processing the other information), along a path separate and distinct from a path over which the other information being processed by the processor is communicated.

In accordance with at least one embodiment, use of an in-band path, such as core-to-hub interconnect, even ECI over core-to-hub interconnect, can involve bringing core-to-hub interconnect out of an idle state and into an active state that uses substantially more power. However, use of an out-of-band path, such as hardware ECI, doesn't affect an overall sleep state. Thus, by detecting the occurrence of an idle state affecting an in-band path and using an out-of-band path that isn't affected by (and that doesn't affect) the idle state, the idle state may be maintained and power savings may be achieved. The out-of-band path may be of lower bandwidth but may lower power. In accordance with at least one embodiment, a decision between an in-band path and an out-of-band path may be workload-based. As an example, where BIOS can measure workload, e.g., CPU utilization, such a metric may be used in a set of criteria upon which such a decision may be based. In accordance with at least one embodiment, an interrupt handler can identify a current C-state (without itself disturbing the current C-state). Based on C-state (and other criteria), the interrupt handler may change the ECI medium between hardware ECI and ECI over core-to-hub interconnect. Based on a CPU utilization rate (and other criteria), the interrupt handler may change the ECI medium between hardware ECI and ECI over core-to-hub interconnect. The interrupt handler may use the identification of the current C-state to detect the existence of a processor dormancy state and may use a measurement of CPU utilization rate as a predictor of a future C-state to predict a likely future processor dormancy state even before such processor dormancy state occurs. In accordance with at least one embodiment, a response may be obtained using a polling method based on periodic interrupts or CPU utilization may be periodically checked and changes made by changing a path selection before a C-state change corresponding to a CPU utilization change occurs.

In accordance with at least one embodiment, a set of criteria for determining whether to use hardware ECI or ECI over core-to-hub interconnect may include environmental conditions which may be used to determine a priority of ECI information. For example, if a processor temperature rises to a near-critical level, such a processor temperature may influence a decision to communicate ECI information over a path most likely to be able to communicate such information quickly and reliably.

In accordance with at least one embodiment, a set of criteria for determining whether to use hardware ECI or ECI over core-to-hub interconnect may include a latency preference to decide ECI information needs to be communicated with minimal latency by using hardware ECI, which does not share its bandwidth with other information. In accordance with at least one embodiment, In accordance with at least one embodiment, a set of criteria for determining whether to use hardware ECI or ECI over core-to-hub interconnect may include an indication that ECI information to be communicated is of sufficient bandwidth to make the use of ECI over core-to-hub interconnect preferable. In accordance with at least one embodiment, such an indication is conditioned upon adequate available bandwidth via core-to-hub interconnect.

In accordance with at least one embodiment, a system management information polling rate may be changed in response to conditions. For example, if a polling rate increases such that it would use bandwidth beyond what hardware ECI can provide, a determination may be made to select communication of system management information via ECI over core-to-hub interconnect. Such a selection process may refrain from using ECI over core-to-hub interconnect until necessitated by ECI bandwidth needs, thereby avoiding use of core-to-hub interconnect bandwidth (e.g., consuming core-to-hub interconnect bandwidth that could otherwise be used for communication of other information over core-to-hub interconnect) and avoiding disturbing a processor dormancy state.

In accordance with at least one embodiment, selection of among a shared, higher bandwidth path and an exclusive, lower bandwidth path for communication of system management information is performed in response to a condition of a parameter selected from a group consisting of environmental conditions, a processor power-saving activity-enablement state (e.g., C-state), and CPU utilization. In accordance with at least one embodiment, a controller performs bilateral state changes between a state of using a shared, higher bandwidth path and a state of using an exclusive, lower bandwidth path for the communication of system management information.

In accordance with at least one embodiment, a controller hub may enable communication of system management information using both hardware ECI and ECI over core-to-hub interconnect by switching a multiplexer back and forth to select among both paths on an ongoing basis. In accordance with at least one embodiment, a processor and a controller hub may be configured to allow out-of-order communication of system management information via both hardware ECI and ECI over core-to-hub interconnect simultaneously. For example, the processor and the controller hub may be configured to rearrange messages of system management information received via both hardware ECI and ECI over core-to-hub interconnect to restore the messages to their proper sequence.

In accordance with at least one embodiment, a processor and a controller hub may prioritize types of traffic being communicated between the processor and the controller hub to most efficiently use both interfaces. As an example, a decision may be made to use hardware ECI for information that needs to be most timely (e.g., thermal management information). As another example, if power monitoring is critical, a decision may be made to dedicate hardware ECI to power monitoring system management information. As yet another example, if a type of system management information is more voluminous but not as time-critical, a decision may be made to communicate such information over ECI over core-to-hub interconnect.

In accordance with at least one embodiment, if a multiplexer is not a strict multiplexer (i.e., a multiplexer that receives information from only one path at a time), then system management information may be divided out among the paths and communicated simultaneously over multiple paths. In accordance with at least one embodiment, even if multiplexer is a strict multiplexer, a controller hub may switch the multiplexer rapidly to allow reception of traffic along both paths, thereby providing adequate bandwidth while minimizing impact of ECI on core-to-hub interconnect bandwidth. In accordance with at least one embodiment, a decision for in-band vs. out-of-band communication of ECI information may be based on any of multiple criteria or combinations thereof. In accordance with at least one embodiment, a switch for selecting between in-band and out-of-band communication of ECI information may be a software switch (i.e., logical multiplexer implemented by executing instruction code on a controller instead of being a physical multiplexer implemented purely in hardware). In accordance with at least one embodiment, attributes of an exclusive, lower bandwidth path may include one or more of lower bandwidth, slower communication, more reliable communication, more timely communication, non-C-state-affecting communication. In accordance with at least one embodiment, a shared, higher bandwidth path may include one or more of higher bandwidth, a common path shared among multiple types of information being communicated (e.g., system management information and non-system management information), a more generalized interface, and a more standardized interface. In accordance with at least one embodiment, a set of criteria for deciding whether to use a shared, higher bandwidth path and an exclusive, lower-bandwidth path may include a metric of another type of utilization other than processor utilization (e.g., bus utilization, memory utilization, register utilization, etc.)

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a processor;
   a controller hub;
   a shared, higher bandwidth path coupling the processor to the controller hub; and
   an exclusive, lower bandwidth path coupling the processor to the controller hub, wherein the processor is configured to communicate system management information over the shared, higher bandwidth path in response to a first set of criteria and to communicate the system management information over the exclusive, lower bandwidth path in response to a second set of the criteria, wherein a first instance of the first set of the criteria is satisfied before an instance of the second set of the criteria is satisfied, and wherein a second instance of the first set of the criteria is satisfied after the instance of the second set of the criteria is satisfied.

2. The information handling system of claim 1, wherein the controller hub is a southbridge controller hub (SCH).

3. The information handling system of claim 1, wherein the exclusive, lower bandwidth path is an environmental control interface (ECI) and the system management information comprises system environmental control information.

4. The information handling system of claim 3, wherein the system environmental control information comprises processor thermal management information.

5. The information handling system of claim 1, wherein the first set of the criteria and the second set of the criteria are based on a power-saving activity-enablement state of the processor.

6. The information handling system of claim 1, wherein the first set of the criteria and the second set of the criteria are based on a utilization metric of the processor.

7. The information handling system of claim 1, wherein the first set of the criteria and the second set of the criteria are user programmable.

8. The information handling system of claim 1, wherein the first set of the criteria and the second set of the criteria are selectable among groups of sets of the criteria.

9. The information handling system of claim 1, wherein one group of the groups of the sets of the criteria is configured to maximize system performance per unit of power consumed.

10. A method comprising:
transitioning from communicating a first message of system management information over a shared, higher bandwidth path to communicating a second message of the system management information over an exclusive, lower bandwidth path in response to a second set of criteria;
transitioning from communicating over the exclusive, lower bandwidth path to communicating a third message of the system management information over the shared, higher bandwidth path in response to a first set of the criteria; and
transitioning from communicating over the shared, higher bandwidth path to communicating a third message of the system management information over the exclusive, lower bandwidth path.

11. The method of claim 10, wherein the exclusive, lower bandwidth path is an environmental control interface (ECI) and the system management information comprises system environmental control information.

12. The method of claim 11, wherein the system environmental control information comprises processor thermal management information.

13. The method of claim 10, wherein the first set of the criteria and the second set of the criteria are based on a power-saving activity-enablement state of the processor and a utilization metric of the processor.

14. The method of claim 10, wherein communicating over the exclusive, lower bandwidth path maintains a dormancy of a power-saving activity-enablement state of the processor.

15. A method comprising:
determining a parameter value of a parameter suggestive of a dormancy of a processor;
in response to the parameter value suggesting the processor to be active, communicating system management information over a higher bandwidth path; and
in response to the parameter value suggesting the processor to be dormant, communicating the system management information over a lower bandwidth path, wherein the communicating the system management information over the lower bandwidth path preserves the dormancy of the processor.

16. The method of claim 15, wherein the system management information comprises processor thermal management information being transmitted directly from the processor to a southbridge controller hub (SCH).

17. The method of claim 16, wherein the SCH provides the system management information to a baseboard management controller (BMC) coupled to the SCH via an intelligent platform management interface (IPMI).

18. The method of claim 15, wherein the parameter suggestive of the dormancy of the processor is a central processing unit (CPU) power state (C-state).

19. The method of claim 15, wherein the parameter suggestive of the dormancy of the processor is a processor utilization metric.

20. The method of claim 15, wherein the communicating the system management information over the higher bandwidth path occurs in conjunction with inter-core communication of the system management information between processor cores of the processor.

* * * * *